(12) United States Patent
Luciano (10) Patent No.: US 10,887,016 B2
(45) Date of Patent: Jan. 5, 2021

(54) METHOD AND SYSTEM FOR HIGH BANDWIDTH, MULTI-CONSUMER DATA AND VIDEO DISTRIBUTION EQUIPMENT

(71) Applicant: James Daniel Luciano, New Hope, PA (US)

(72) Inventor: James Daniel Luciano, New Hope, PA (US)

(73) Assignee: MDS LINK, INC., New Hope, PA (US)

( * ) Notice: Subject to any disclaimer, the term of this patent is extended or adjusted under 35 U.S.C. 154(b) by 0 days.

(21) Appl. No.: 15/542,144

(22) PCT Filed: Jan. 7, 2016

(86) PCT No.: PCT/US2016/012474
§ 371 (c)(1),
(2) Date: Jul. 7, 2017

(87) PCT Pub. No.: WO2016/112184
PCT Pub. Date: Jul. 14, 2016

(65) Prior Publication Data
US 2018/0269974 A1    Sep. 20, 2018

Related U.S. Application Data

(60) Provisional application No. 62/100,624, filed on Jan. 7, 2015.

(51) Int. Cl.
*H04N 21/44* (2011.01)
*H04B 10/2575* (2013.01)
*H04Q 11/00* (2006.01)
*H04N 21/234* (2011.01)
*H04N 21/61* (2011.01)
*H04N 21/4363* (2011.01)
*H04N 7/10* (2006.01)

(52) U.S. Cl.
CPC ....... *H04B 10/25751* (2013.01); *H04N 7/106* (2013.01); *H04N 21/234* (2013.01); *H04N 21/43637* (2013.01); *H04N 21/44* (2013.01); *H04N 21/6118* (2013.01); *H04N 21/6131* (2013.01); *H04N 21/6168* (2013.01); *H04N 21/6181* (2013.01); *H04Q 11/0067* (2013.01)

(58) Field of Classification Search
None
See application file for complete search history.

(56) References Cited

U.S. PATENT DOCUMENTS 8,543,008 B2 *  9/2013  Soto ............... H04M 19/08
                                           398/171
8,737,430 B2    5/2014  Bagasra
                        (Continued)

OTHER PUBLICATIONS

International Search Report of PCT/US2016/012474 dated Mar. 18, 2016.

*Primary Examiner* — Cai Y Chen
(74) *Attorney, Agent, or Firm* — Polsinelli PC (57) ABSTRACT

A method for use in a headend communications device, the method including receiving an input data signal over a fiber optic port, switching the input data signals to a plurality of data signals, converting the data signals to output coaxial cable signals and transmitting the output coaxial cable signals.

22 Claims, 7 Drawing Sheets

(56) References Cited

U.S. PATENT DOCUMENTS

| | | | |
|---|---|---|---|
| 8,792,565 B2* | 7/2014 | Petrovic | H04N 7/104 |
| | | | 375/257 |
| 8,842,991 B2 | 9/2014 | Liang et al. | |
| 2009/0083279 A1* | 3/2009 | Hasek | H04L 67/2823 |
| 2009/0180782 A1* | 7/2009 | Bernard | H04B 10/25751 |
| | | | 398/140 |
| 2011/0107404 A1 | 5/2011 | Ramsdell et al. | |
| 2013/0070640 A1* | 3/2013 | Chapman | H04L 12/2801 |
| | | | 370/254 |

* cited by examiner

METHOD AND SYSTEM FOR HIGH BANDWIDTH, MULTI-CONSUMER DATA AND VIDEO DISTRIBUTION EQUIPMENT

CROSS REFERENCE TO RELATED APPLICATION

This application is national stage application of International Application No. PCT/US2016/012474, filed on Jan. 7, 2016, which claims the benefit of U.S. Provisional Application No. 62/100,624, filed Jan. 7, 2015, the entire contents of which is incorporated herein by reference.

FIELD OF INVENTION

The disclosed embodiments are generally directed to methods and systems for distributing signals, including video and data signals, to multiple consumers, with high bandwidth (BW) throughput data signals.

BACKGROUND

[Multimedia over Coax Alliance (MoCA) equipment provides for the distribution of high quality digital transmissions throughout facilities with coaxial cable, including facilities with legacy or existing coaxial cable. For example, MoCA equipment may provide high quality multimedia content transmissions over the existing coaxial cable in a residence. MoCA equipment may be used by cable, satellite and telecommunications service providers, and allows customers to receive broadband digital media content via satellite, cable, telephony or Internet network connections.

Under MoCA, consumers may use advanced data and video equipment and applications, such as integrated in-home multimedia distribution services including multi-room high definition (HD) digital video recorders (DVRs). Headend equipment, consumer premises equipment (CPE) and media centers may be used as MoCA compliant equipment. Media centers may store, manage and maintain the rights to content. Also, media centers may then communicate the content or distribute the content to other media appliances in the home. Headends may distribute data and video signals to one or more CPEs.

SUMMARY

Methods and systems for distributing signals, including video and data signals, to multiple consumers, with high bandwidth (BW) throughput data signals are disclosed herein. The methods and systems disclosed herein may include remote management, configuration, control and maintenance.

A headend may receive an input data signal over a fiber optic port and switch the signal to a plurality of data signals. The headend may convert the plurality of data signals, which may be Ethernet data signals or which may be converted to Ethernet data signals, to a plurality of output coaxial cable signals. Further, the headend may transmit the plurality of output coaxial cable signals via coaxial cable to a plurality of pieces of consumer premises equipment (CPE).

The output coaxial cable signals may be Multimedia over Coax Alliance (MoCA) compliant signals, and may comply with MoCA 1.1, MoCA 2.0 and/or MoCA 3.0. The input data signal may be up to a high bandwidth 10 gigabits per second (Gb/s) data signal received over a fiber optic port and each output coaxial cable signal may be up to a 1 Gb/s signal. The headend may also receive up to a 20 Gb/s signal through two transceivers connected to two fiber optic ports, up to a 30 Gb/s signal through three transceivers connected to three fiber optic ports, up to a 40 Gb/s signal through four transceivers connected to four fiber optic ports and up to a 50 Gb/s signal through five transceivers connected to five fiber optic ports.

The headend may receive the input data signal through a small form factor pluggable (XPF) fiber optic transceiver or a 12× small form factor pluggable (CXP) fiber optic transceiver. The headend may receive up to 10 GB/s, 20 Gb/s, 30 Gb/s, 40 Gb/s, 50 Gb/s, 100 Gb/s and 200 Gb/s data signals through one or more XPF fiber optic transceivers or CXP fiber optic transceivers.

In an example, the input data signal may be a Gigabit Passive Operating Network (GPON) signal. The GPON signal may be converted to an Ethernet signal.

The headend may transmit the 1 Gb/s data signal to each CPE in a set of multiple CPEs. As examples, the set of CPEs may include 4, 8, 16, 24, 48 or 64 CPEs.

The headend may transmit data and video signals over a radio frequency (RF) coaxial cable backbone to the CPEs. The headend may transmit the video signal and data signal at different frequencies over the same RF coaxial cable to each CPE. The headend may operate as a headend server and include local processing capabilities. In addition, the headend may receive one or more data signals from one or more CPEs over the coaxial cable backbone and transmit the one or more data signals over a fiber optic port.

In addition, a video on demand (VoD) server may route video and other data through the GbE switch to the headend. Also, the headend may operate as a headend server and include local processing capabilities. The headend may also receive one or more input CATV signals over one or more CATV line drops.

In an example, the headend may combine various features in a single device. For example, the headend may combine the features of converting Ethernet signals to coaxial cable signals, a VoD server, operating as a headend server and offloading transmissions from a wireless telecommunications provider.

In a further example, the headend may combine the features of receiving a GPON signal, converting the GPON signal to an Ethernet signal, operating as a headend server, then converting the Ethernet signal to a coaxial cable signal and transmitting the coaxial cable signal to a CPE. The headend may combine the features of receiving a GPON signal, converting the GPON signal to an Ethernet signal, operating as a headend server, then converting the Ethernet signal to a coaxial cable signal, transmitting the coaxial cable signal to a CPE and a VoD server. The headend may also combine the features of receiving a GPON signal, converting the GPON signal to an Ethernet signal, operating as a headend server, then converting the Ethernet signal to a coaxial cable signal, transmitting the coaxial cable signal to a CPE, a VoD server and offloading transmissions from a wireless telecommunications provider.

BRIEF DESCRIPTION OF THE DRAWINGS

A more detailed understanding may be had from the following description, given by way of example in conjunction with the accompanying drawings wherein.

DETAILED DESCRIPTION

Figure 1:
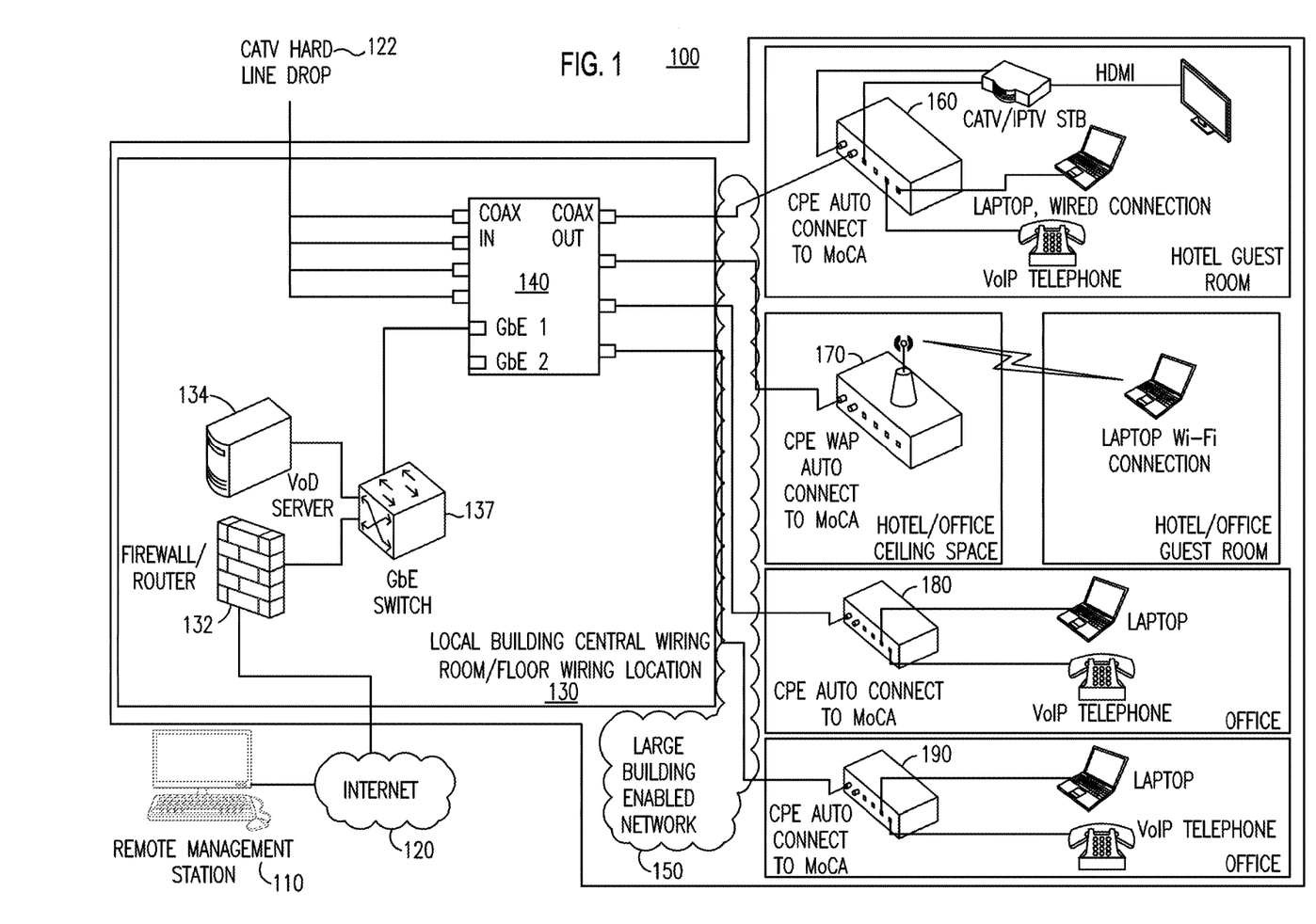
FIG. 1 is a system diagram of an example signal distribution network system in which one or more disclosed embodiments may be implemented.

FIG. 1 is a system diagram of an example signal distribution system in which one or more disclosed embodiments may be implemented. As shown in system 100, an input data signal may be received from the Internet 120 and/or other networks, and may be routed through a router 132. The input data signal may be received through an Internet service provider (ISP), such as a cable television (CATV) service provider or a telecommunications provider. The input data signal may be received in a central wiring room 130 of a building. In an example, the input data signal may be an Ethernet signal.

In another example, the input data signal may be another type of signal. The building may be a large building, such as a hotel, office building or apartment building. The input data signal may be transmitted via a fiber optic cable. The router 132 may contain a firewall. The input data signal may then be routed through a gigabit Ethernet (GbE) switch 137 to a headend 140. In an example, transmission of the input data signal to the headend may be controlled by a remote management station 110. The input data signal may include high bandwidth (BW) signals, including up to 10 gigabits per second (Gb/s), 20 Gb/s, 30 Gb/s, 40 Gb/s, 50 Gb/s, 100 Gb/s and 200 Gb/s data signals.

The headend may receive the input data signal through a small form factor pluggable (XPF) fiber optic transceiver. As an example, the headend may receive up to a 10 Gb/s signal through a single XPF transceiver connected to a single fiber optic port. As further examples, the headend may receive up to a 20 Gb/s signal through two XPF transceivers connected to two fiber optic ports, up to a 30 Gb/s signal through three XPF transceivers connected to three fiber optic ports, up to a 40 Gb/s signal through four XPF transceivers connected to four fiber optic ports and a up to 50 Gb/s signal through five XPF transceivers connected to five fiber optic ports.

In a further example, the headend may receive up to a 40 Gb/s signal through a single XPF transceiver connected to a single fiber optic port. In another further example, the headend may receive up to an 80 Gb/s signal through two XPF transceivers connected to two fiber optic ports. In still another example, the headend may receive up to a 160 Gb/s signal through four XPF transceivers connected to four fiber optic ports. In yet another example, the headend may receive up to a 100 Gb/s signal through a single XPF transceiver connected to a single fiber optic port. In yet a further example, the headend may receive up to a 200 Gb/s signal through two XPF transceivers connected to two fiber optic ports.

In an additional example, the headend may receive up to 10 GB/s, 20 Gb/s, 30 Gb/s, 40 Gb/s, 50 Gb/s, 100 Gb/s and 200 Gb/s data signals through one or more 12× small form factor pluggable (CXP) fiber optic transceivers. One of ordinary skill in the art will appreciate that the CXP fiber optic transceiver may operate in a manner similar to that of the XPF transceiver as described herein.

Further, a video on demand (VoD) server 134 may route video and other data through the GbE switch 137 to the headend 140. The headend may receive the video and data through a first GbE input. In an additional example, the headend 140 may operate as a headend server and include local processing capabilities. The headend may also receive one or more input CATV signals over one or more CATV line drops 122. As an example shown in FIG. 1, the headend may receive 4 CATV signals. As further examples, the headend may receive 8, 16, 24 or 48 CATV signals or channels. The CATV line drops may include radio frequency (RF) coaxial cables. In an example, the headend may receive the input CATV signal from a cable TV service provider. In a further example, the headend my receive additional data from a second GbE switch through a second GbE input.

The headend may transmit the one or more video signals and one or more data signals to one or more pieces of consumer premises equipment (CPE) 160, 170, 180, 190. The headend may transmit the video signal and data signal at different frequencies over the same RF coaxial cable network 150 to each CPE. The cable network 150 may be a network in a large building. The headend may transmit a data signal of 1 Gb/s to each CPE in a set of multiple CPEs. As examples, the set of CPEs may include 4, 8, 16, 24, 48 or 64 CPEs. The data signal may be an Ethernet over coaxial cable (EoC) signal. Further, the data signal may be a Multimedia over Coax Alliance (MoCA) compliant signal. As an example, the headend and CPEs may operate in MoCA 1.1 EoC mode. As a further example, the headend and CPEs may operate in MoCA 2.0 EoC mode. Operation in MoCA 2.0 may include MoCA 2.0 turbo operation. In yet another example, the headend and CPEs may operate in MoCA 3.0 EoC mode.

In an example, the headend 140 may be located in a large building, such as an office building, apartment building or hotel, and may transmit the video and data signals to one or more CPEs, such as CPEs 160, 170, 180, 190, located in different offices, apartments or hotel rooms. Each CPE may be used by a different subscriber, consumer or customer. Each CPE may transmit data signals, through a wired or wireless connection, to up to four consumer or customer devices, such as a laptop or desktop computer, a voice over internet protocol (VOIP) telephone, a mobile telephone, a touch pad device and the like. The headend may transmit over an RF coaxial cable backbone to the CPEs. The RF coaxial cable backbone may include the coaxial cable infrastructure 150 of the large building. In addition, the headend may receive one or more data signals from one or more CPEs 160, 170, 180, 190 over the coaxial cable backbone and transmit the one or more data signals over a fiber optic port.

As used herein, a CPE may refer to a modem, a cable modem, an adapter, a subscriber box or a gateway, and these terms may be used interchangeably. A CPE may also have router functionality. As used herein, a headend may refer to multichannel data and video distribution equipment, and these terms may be used interchangeably.

Figure 2:
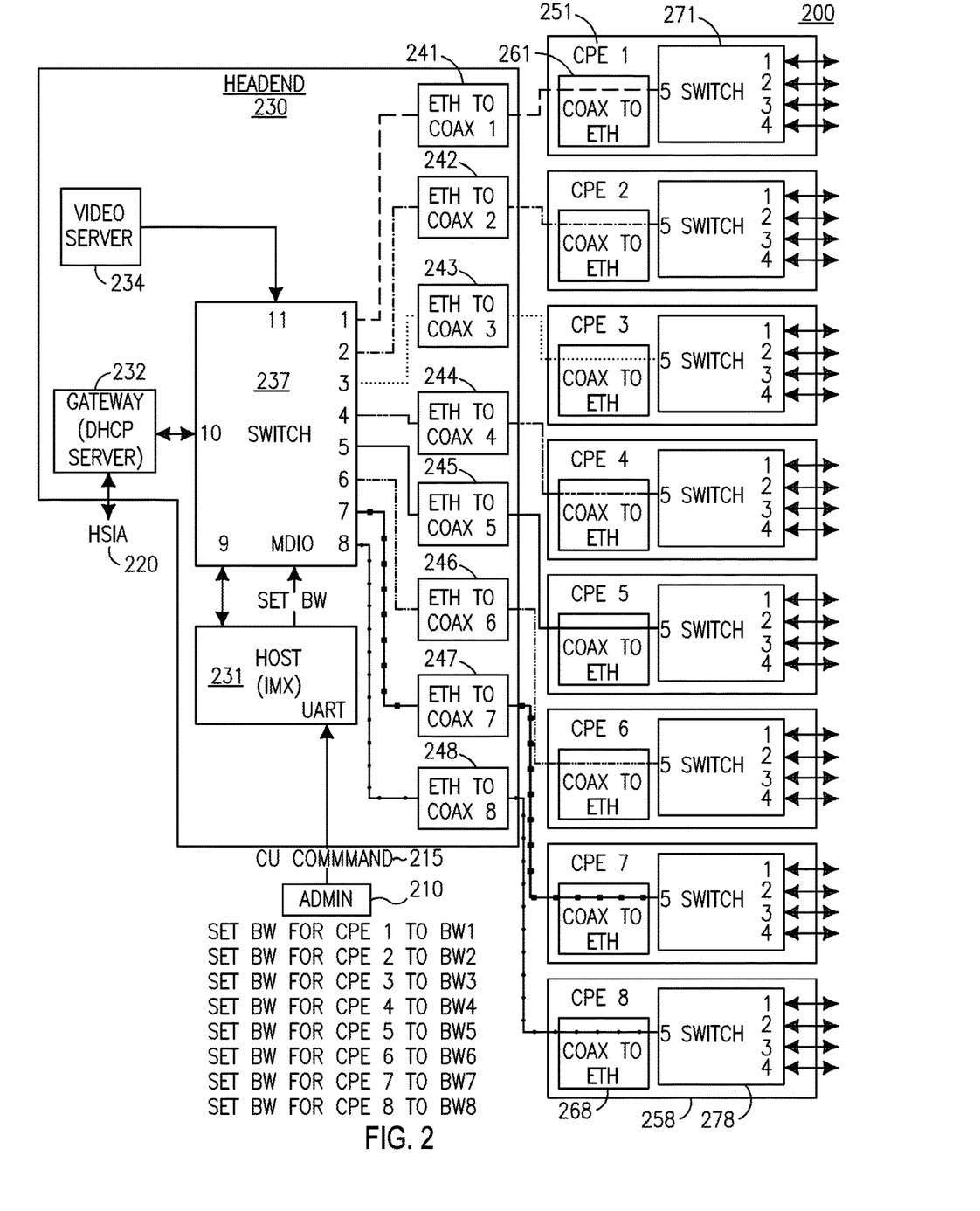
FIG. 2 is a system diagram of an example headend and 8 pieces of consumer premises equipment (CPE)

FIG. 2 is a system diagram of an example headend and 8 CPEs. The headend may be used within the signal distribution system illustrated in FIG. 1. As shown in system 200, the headend 230 may include a switch 237 and one or more Ethernet to coaxial microchip processors, such as Ethernet to coaxial microchip processors 241, 242, 243, 244, 245, 246, 247, 248. The Ethernet to coaxial microchip processors may be MoCA microchip processors. In examples, the headend 230 may also include a gateway 232 or a video server 234 or both. In a further example, the headend 230 may operate as a headend server and include local processing capabilities.

The headend 230 may receive a high-speed internet access (HSIA) data signal 220. In an example, the headend 230 may receive the HSIA signal 220 through the gateway 232. The gateway 232 may include a dynamic host configuration protocol (DHCP) server and may send the data signal to the switch 237. The switch 237 may also receive video signals from a CATV provider or from a video server 234 or both. The switch 237 may transmit the video and data signals to one or more CPEs, such as CPE 251 (CPE 1) through CPE 258 (CPE 8). The switch 237 may transmit a data signal on a different channel frequency for each CPE and may transmit the video signal on a different frequency than that used for the data signals. The switch 237 may assign various throughput BWs to the CPEs, and may assign up to 1 Gb/s throughput BW. For example, the switch 237 may assign a 200 megabits per second (Mb/s) throughput BW, a 500 Mb/s throughput BW or a 1 Gb/s throughput BW to a CPE. In a further example, the switch may assign a throughput BW based on a setting for a service level set by a service provider, such as a cable TV service provider or a telecommunications provider. BW throughput assignment, provisioning and control may be remotely configurable. For example, an administrator 210 may send one or more commands 215 to a host 231, through a Universal Asynchronous Receiver/Transmitter (UART) to remotely configure BW throughput assignment, provisioning and control. The host 231 may transmit the command to the switch 237 through the Management Data Input/Output (MDIO) bus in the switch 237.

In a further example, the switch 237 may assign up to 2.6 Gb/s throughput to a CPE. In yet another example, the switch 237 may assign up to 3.4 Gb/s throughput to a CPE. In still another example, the switch 237 may assign up to 10 Gb/s throughput to a CPE. The switch 237 may provide a total data output throughput of varying amounts, depending upon the number of CPEs and the throughput set per CPE. As some examples, the switch 237 may provide a total data output throughput of up to 4, 8, 16, 24, 48, 64 and 200 Gb/s, based on the number of CPEs and the settings. In a further example, the switch 237 may provide a total data output throughput of up to 166.4 Gb/s, if, for example, a 2.6 Gb/s throughput were set for each of 64 CPEs. Depending upon additional capacity for data input, further total data output throughput may be provided. For example, the switch 237 may provide a total data output throughput of up to 217.6 Gb/s, if, for example, a 3.4 Gb/s throughput were set for each of 64 CPEs. In another example, the switch 237 may provide a total data output throughput of up to 640 Gb/s, if, for example, a 10 Gb/s throughput were set for each of 64 CPEs. The switch 237 may also provide additional options, with lower throughput for each CPE and a smaller number of CPEs.

As an example, the headend 230 may transmit the data and video signal to CPE 1 251 using BW1. Further, if the headend transmits to 8 CPEs at up to 1 Gb/s per CPE, the headend may transmit data signals on 8 channels, assign 8 BWs, and transmit a total of 8 Gb/s throughput. The headend may transmit the video signal on a different frequency than the data signals. As a further example, the headend may transmit to 4, 16, 24, 48 and 64 CPEs, and accordingly may transmit data signals on 4, 16, 24, 48 and 64 channels, assign 4, 16, 24, 48 and 64 BWs, and transmit a total of up to 4, 16, 24, 48 and 64 Gb/s throughput.

In a further example, if the headend transmits to 8 CPEs at up to 2.6 Gb/s per CPE, the headend may transmit data signals on 8 channels, assign 8 BWs, and transmit a total of 20.8 Gb/s throughput. The headend may transmit the video signal on a different frequency than the data signals. As a further example, the headend may transmit to 3, 4, 16, 24, 48 and 64 CPEs, and accordingly may transmit data signals on 3, 4, 16, 24, 48 and 64 channels, assign 3, 4, 16, 24, 48 and 64 BWs, and transmit a total of up to 7.8, 10.4, 41.6, 62.4, 124.8 and 166.4 Gb/s throughput. One of ordinary skill in the art will understand that the headend may transmit at other throughput amounts depending upon the number of CPEs the headend transmits to, the throughput per CPE and the available additional capacity of the input signals.

Further, the switch may send the signals to Ethernet to coaxial microchip processors for transmission to the CPEs via F connectors. The microchip processors may include MoCA compliant microchip processors. In an example, one microchip may be used for each CPE. In a further example, two microchip processors may be used for each CPE. Each Ethernet to coaxial microchip processor may receive an Ethernet signal from the switch, convert the Ethernet signal to a coaxial cable signal and transmit the signal via coaxial cable to a CPE.

As an example, the microchip processors may be MoCA 2.0 turbo microchip processors which may each transmit 500 Mb/s to each CPE. In this example, if the headend transmits to 8 CPEs, 8 MoCA 2.0 turbo microchip processors may be used. Further, the headend may transmit to 4, 16, 24, 48 and 64 CPEs and accordingly may use 4, 16, 24, 48 and 64 MoCA 2.0 turbo microchip processors. As a further example, the headend may use two MoCA 2.0 turbo microchip processors which may transmit 1 Gb/s to each CPE. The two microchip processors may be bonded. In this example, if the headend transmits to 8 CPEs, 16 MoCA 2.0 turbo microchip processors may be used. Further, the headend may transmit to 4, 16, 24, 48 and 64 CPEs and accordingly may use 8, 32, 48, 96 and 128 MoCA 2.0 turbo microchip processors.

In a further example, the microchip processors may be MoCA 3.0 microchip processors which may each transmit increased throughput, such as 2.6 Gb/s, 3.4 Gb/s or 10 Gb/s to each CPE. One of ordinary skill in the art will understand that various combinations of CPEs and throughput settings may be used under MoCA 3.0.

In a further example, the headend may include microchip processors that will provide the headend with the capability to transmit and receive up to 2.6 Gb/s to each CPE. Further, the processor may be capable of increased bandwidth transmission and reception, including, for example, 3.4 Gb/s, 10 Gb/s, 20 Gb/s, 30 Gb/s, 40 Gb/s, 50 Gb/s, 100 Gb/s and 200 Gb/s. In addition, the CPE may include a processor that will provide the CPE with the capability to transmit and receive up to 3.4 Gb/s. As in the headend, the processor of the CPE may be capable of increased bandwidth transmission and reception, including 10 Gb/s, 20 Gb/s, 30 Gb/s, 40 Gb/s, 50 Gb/s, 100 Gb/s and 200 Gb/s.

In a further example with 8 CPEs, the microchip processors may each transmit 2.6 Gb/s to each CPE. If the headend transmits to 8 CPEs for a total of 20.6 Gb/s throughput, 8 such 2.6 Gb/s microchip processors may be used.

Other various combinations of the microchip processors may be used to increase total throughput and throughput per CPE, as one of ordinary skill in the art will appreciate. Further examples of the combinations of the microchip processors are disclosed herein, although one of ordinary skill in the art will appreciate that examples beyond these may be used.

Each CPE may include a coaxial to Ethernet microchip and a switch. Further, each CPE may receive signals over an RF coaxial cable including a CATV video signal and a data signal. For example, CPE 251 (CPE 1), through coaxial to Ethernet microchip 261, may receive a signal over an RF coaxial cable from the headend 230, through Ethernet to coaxial microchip 241. The coaxial to Ethernet microchip 261 may then convert the coaxial cable signal to an Ethernet signal and send the signals to the switch 271. The switch 271 may then transmit the signals to up to four devices of the consumer or customer, such as a laptop or desktop computer through a wired or wireless connection, a voice over internet protocol (VOIP) telephone, a mobile telephone, a touch pad device and the like. In a further example, CPE 258 (CPE 8), through coaxial to Ethernet microchip 268, may receive a signal over an RF coaxial cable from the headend 230, through Ethernet to coaxial microchip 248. The coaxial to Ethernet microchip 268 may then convert the coaxial cable signal to an Ethernet signal and send the signals to the switch 278. The switch 278 may then transmit the signals to up to four devices of the consumer or customer Similar transmissions may be made from the headend 230 to CPE 2 through CPE 7.

In addition, the headend 230 may receive a data signal from each CPE over the RF coaxial cable system and transmit the data signal to the Internet and/or other networks over the fiber optic port. The CPE may receive the data signal from a device of a consumer or customer. For example, CPE 251 (CPE 1), through switch 271, may receive a data signal from a device of a consumer or customer. The switch 271 may transmit the data signal to coaxial to Ethernet microchip 261. Then, the headend 230, through Ethernet to coaxial microchip 241, may receive the data signal from CPE 251 (CPE 1), through coaxial to Ethernet microchip 261. Further, CPE 258 (CPE 8), through switch 278, may receive a data signal from a device of another consumer or customer and the switch 271 may transmit the data signal to coaxial to Ethernet microchip 268. Then, the headend 230, through Ethernet to coaxial microchip 248, may receive the data signal from CPE 258 (CPE 8), through coaxial to Ethernet microchip 268. Similar transmissions may be made from CPE 2 through CPE 7 to the headend 230.

Figure 3:
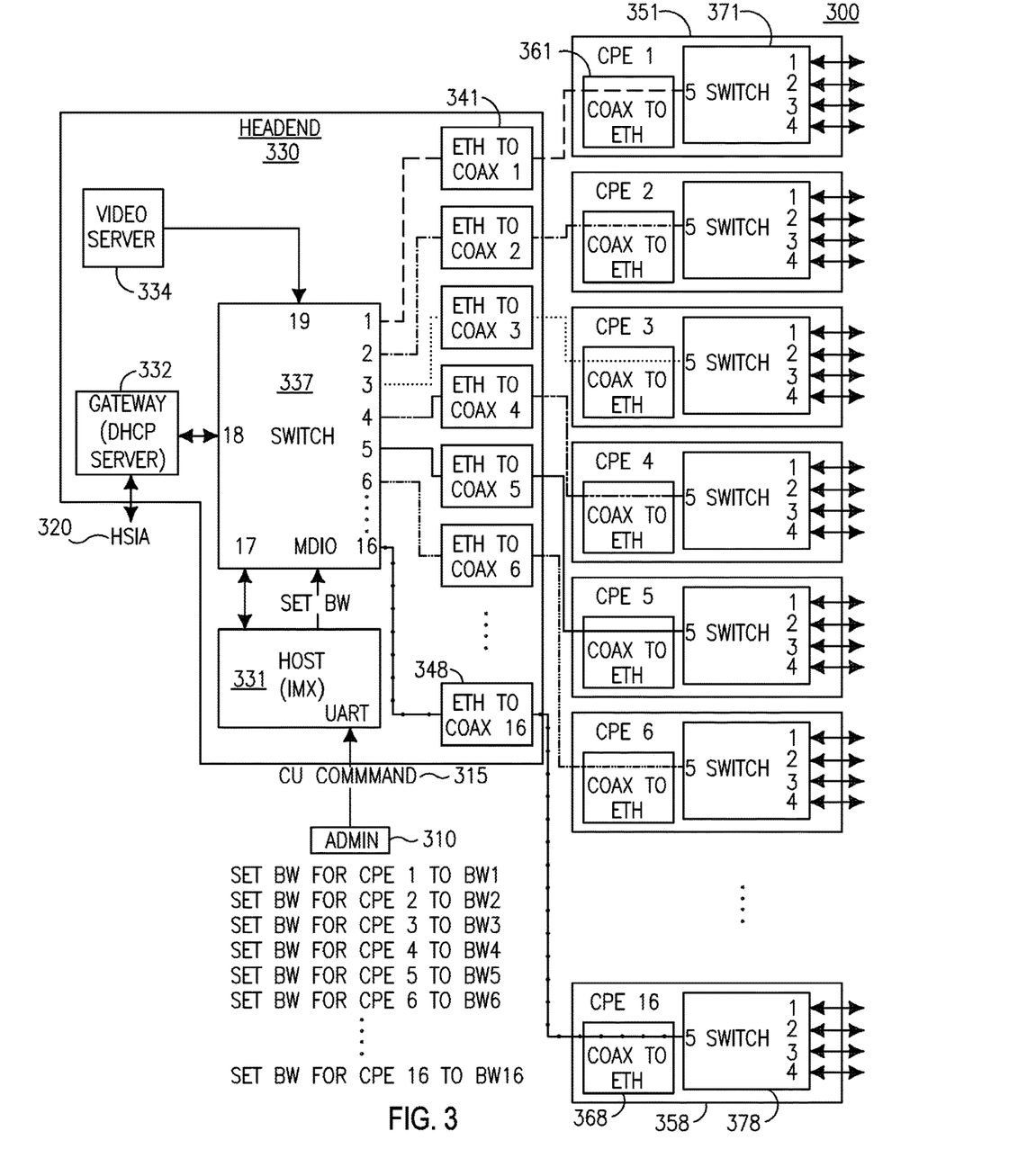
FIG. 3 is a system diagram of an example headend and 16 CPEs.

FIG. 3 is a system diagram of an example headend and 16 CPEs. In an example shown in system 300, the headend 330 may transmit to 16 CPEs, such as CPE 351 (CPE 1) through CPE 358 (CPE 16), and, accordingly, the headend 330 may transmit data signals on 16 channels and assign 16 BWs. The switch 337 may transmit a data signal on a different channel for each of the 16 CPEs. The headend 330 may transmit the video signal on a different frequency than the data signals.

Further, the switch 337 may send the signals to Ethernet to coaxial microchip processors, such as Ethernet to coaxial microchip 341 through Ethernet to coaxial microchip 348, for transmission to the 16 CPEs. Further, the headend 330 may receive a data signal from each CPE over the RF coaxial cable system and transmit the data signal to the Internet and/or other networks over the fiber optic port. In a further example, the headend 330 may operate as a headend server and include local processing capabilities.

Similarly to the example shown in system 200 in FIG. 2, in system 300 the headend 330 may receive an HSIA data signal 320 through a gateway 332, which may include a DHCP server and may then send the data signal to the switch 337. The switch 337 may also receive video signals from a CATV provider or from a video server 334 or both. Further, an administrator 310 may send one or more commands 315 to a host 331 to remotely configure BW throughput assignment, provisioning and control.

Further, as in system 200 in FIG. 2, each CPE may receive signals over an RF coaxial cable including a CATV video signal and a data signal. For example, CPE 351 (CPE 1), through coaxial to Ethernet microchip 361, may receive a coaxial cable signal from the headend 330, through Ethernet to coaxial microchip 341. The coaxial to Ethernet microchip 361 may then convert the coaxial cable signal to an Ethernet signal and send the signals to the switch 371 for transmission to up to four devices of the consumer or customer. In like manner, CPE 358 (CPE 16), through coaxial to Ethernet microchip 368, may receive a coaxial cable signal from the headend 330, through Ethernet to coaxial microchip 348, and coaxial to Ethernet microchip 368 may then convert the coaxial cable signal to an Ethernet signal and send the signals to the switch 378 for transmission to up to four devices of the consumer or customer. Similar transmissions may be made from the headend 330 to CPE 2 through CPE 15 (CPE 7 through CPE 15 not shown).

In addition, as in system 200 in FIG. 2, the headend 330 may receive a data signal from each CPE. For example, CPE 351 (CPE 1), through switch 371, may receive a data signal from a device of a consumer or customer and the switch 371 may transmit the data signal to coaxial to Ethernet microchip 361, which may transmit the signal to the headend 330, through Ethernet to coaxial microchip 341. Similarly, CPE 358 (CPE 16), through switch 378, may receive a data signal from a device of another consumer or customer and the switch 371 may transmit the data signal to coaxial to Ethernet microchip 368 for transmission to the headend 330, through Ethernet to coaxial microchip 348. Similar transmissions may be made from CPE 2 through CPE 15 (not shown) to the headend 330.

Figure 4:
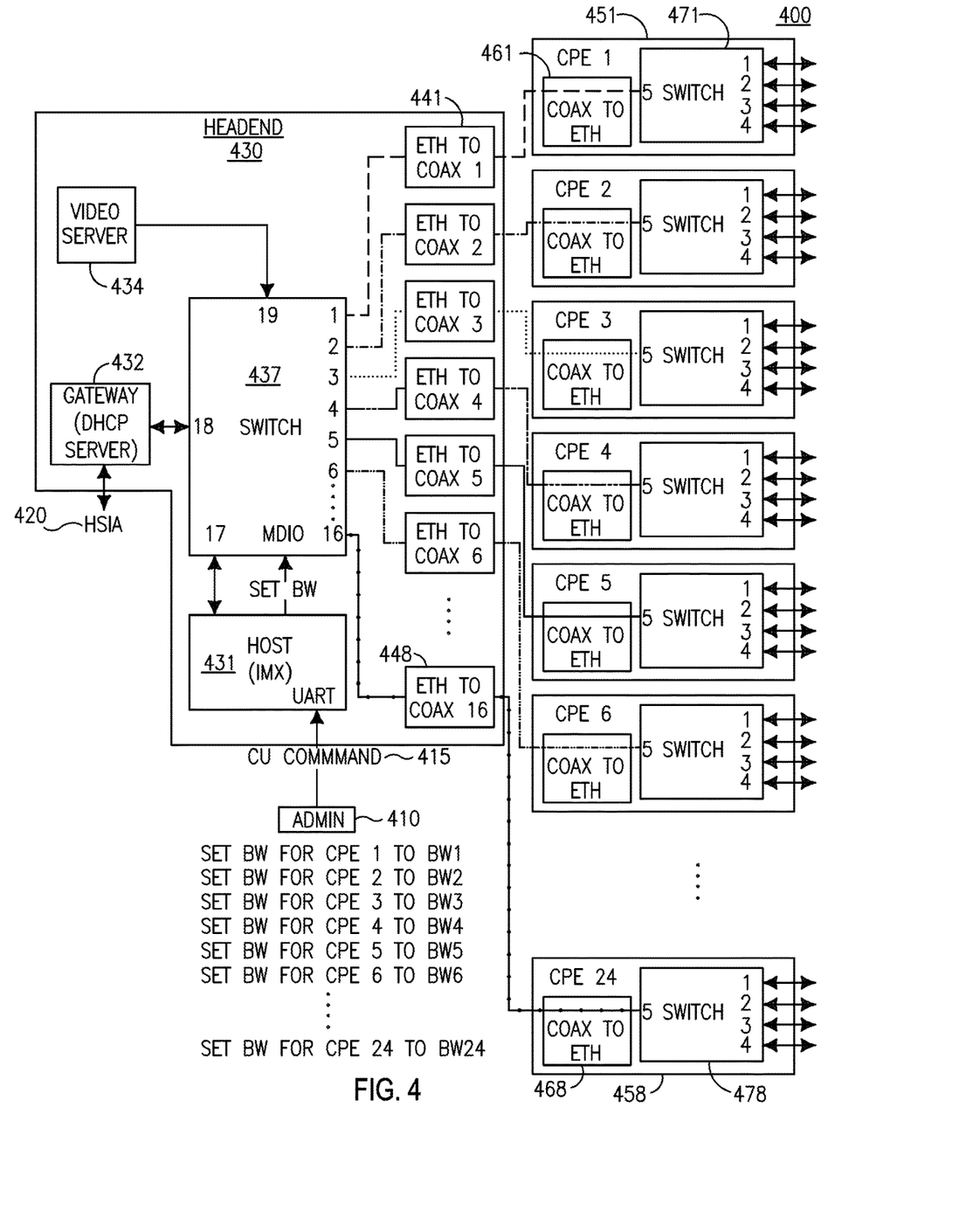
FIG. 4 is a system diagram of an example headend and 24 CPEs.

FIG. 4 is a system diagram of an example headend and 24 CPEs. In an example shown in system 400, the headend 430 may transmit to 24 CPEs, such as CPE 451 (CPE 1) through CPE 458 (CPE 24), and, accordingly, the headend 430 may transmit data signals on 24 channels and assign 24 BWs. The switch 437 may transmit a data signal on a different channel for each of the 24 CPEs. The headend 430 may transmit the video signal on a different frequency than the data signals.

Similarly to the example shown in system 200 in FIG. 2 and system 300 in FIG. 3, in system 400 the headend 430 may receive an HSIA data signal 420 through a gateway 432, which may include a DHCP server and may then send the data signal to the switch 437. The switch 437 may also receive video signals from a CATV provider or from a video server 434 or both. Further, an administrator 410 may send one or more commands 415 to a host 431 to remotely configure BW throughput assignment, provisioning and control.

Further, as in system 200 in FIG. 2 and system 300 in FIG. 3, each CPE may receive signals over an RF coaxial cable including a CATV video signal and a data signal. For example, CPE 451 (CPE 1), through coaxial to Ethernet microchip 461, may receive a coaxial cable signal from the headend 430, through Ethernet to coaxial microchip 441. The coaxial to Ethernet microchip 461 may then convert the coaxial cable signal to an Ethernet signal and send the signals to the switch 471 for transmission to up to four devices of the consumer or customer. In like manner, CPE 458 (CPE 24), through coaxial to Ethernet microchip 468, may receive a coaxial cable signal from the headend 430, through Ethernet to coaxial microchip 448, and coaxial to Ethernet microchip 468 may then convert the coaxial cable signal to an Ethernet signal and send the signals to the switch 478 for transmission to up to four devices of the consumer or customer. Similar transmissions may be made from the headend 430 to CPE 2 through CPE 23 (CPE 7 through CPE 23 not shown).

In addition, as in system 200 in FIG. 2 and system 300 in FIG. 3, the headend 430 may receive a data signal from each CPE. For example, CPE 451 (CPE 1), through switch 471, may receive a data signal from a device of a consumer or customer and the switch 471 may transmit the data signal to coaxial to Ethernet microchip 461, which may transmit the signal to the headend 430, through Ethernet to coaxial microchip 441. Similarly, CPE 458 (CPE 24), through switch 478, may receive a data signal from a device of another consumer or customer and the switch 471 may transmit the data signal to coaxial to Ethernet microchip 468 for transmission to the headend 430, through Ethernet to coaxial microchip 448. Similar transmissions may be made from CPE 2 through CPE 23 (not shown) to the headend 430.

Figure 5:
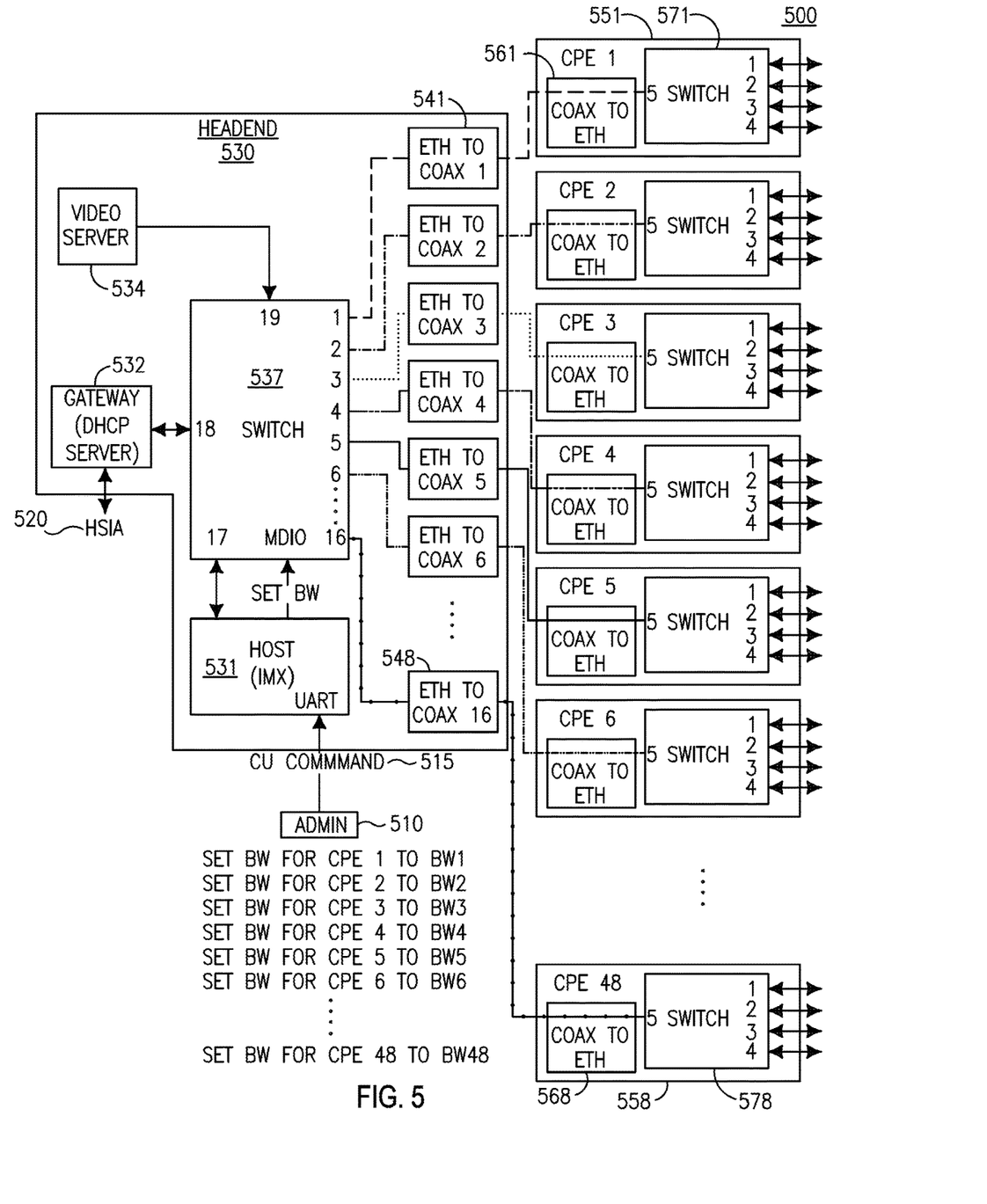
FIG. 5 is a system diagram of an example headend and 48 CPEs.

FIG. 5 is a system diagram of an example headend and 48 CPEs. In an example shown in system 500, the headend 530 may transmit to 48 CPEs, such as CPE 551 (CPE 1) through CPE 558 (CPE 48), and, accordingly, the headend 530 may transmit data signals on 48 channels and assign 48 BWs. The switch 537 may transmit a data signal on a different channel for each of the 48 CPEs. The headend 530 may transmit the video signal on a different frequency than the data signals.

Similarly to the example shown in system 200 in FIG. 2, system 300 in FIG. 3 and system 400 in FIG. 4, in system 500 the headend 530 may receive an HSIA data signal 520 through a gateway 532, which may include a DHCP server and may then send the data signal to the switch 537. The switch 537 may also receive video signals from a CATV provider or from a video server 534 or both. Further, an administrator 510 may send one or more commands 515 to a host 531 to remotely configure BW throughput assignment, provisioning and control.

Further, as in system 200 in FIG. 2, system 300 in FIG. 3 and system 400 in FIG. 4, each CPE may receive signals over an RF coaxial cable including a CATV video signal and a data signal. For example, CPE 551 (CPE 1), through coaxial to Ethernet microchip 561, may receive a coaxial cable signal from the headend 530, through Ethernet to coaxial microchip 541. The coaxial to Ethernet microchip 561 may then convert the coaxial cable signal to an Ethernet signal and send the signals to the switch 571 for transmission to up to four devices of the consumer or customer. In like manner, CPE 558 (CPE 48), through coaxial to Ethernet microchip 568, may receive a coaxial cable signal from the headend 530, through Ethernet to coaxial microchip 548, and coaxial to Ethernet microchip 568 may then convert the coaxial cable signal to an Ethernet signal and send the signals to the switch 578 for transmission to up to four devices of the consumer or customer. Similar transmissions may be made from the headend 530 to CPE 2 through CPE 47 (CPE 7 through CPE 47 not shown).

In addition, as in system 200 in FIG. 2, system 300 in FIG. 3 and system 400 in FIG. 4, the headend 530 may receive a data signal from each CPE. One of ordinary skill in the art will understand that CPE 551 (CPE 1) through CPE 558 (CPE 48) in system 500 will transmit data to headed 530 similarly to that in system 200 in FIG. 2, system 300 in FIG. 3 and system 400 in FIG. 4.

In an additional example, not shown for conciseness, an example headend may transmit to 64 CPEs, One of ordinary skill in the art will understand that the headend and the 64 CPEs may operate in a manner similar to that in system 200 in FIG. 2, system 300 in FIG. 3, system 400 in FIG. 4 and system 500 in FIG. 5. One of ordinary skill in the art will understand that various different combinations of data signal inputs to the headend and throughputs to the CPEs may be used in different examples.

Figure 6:
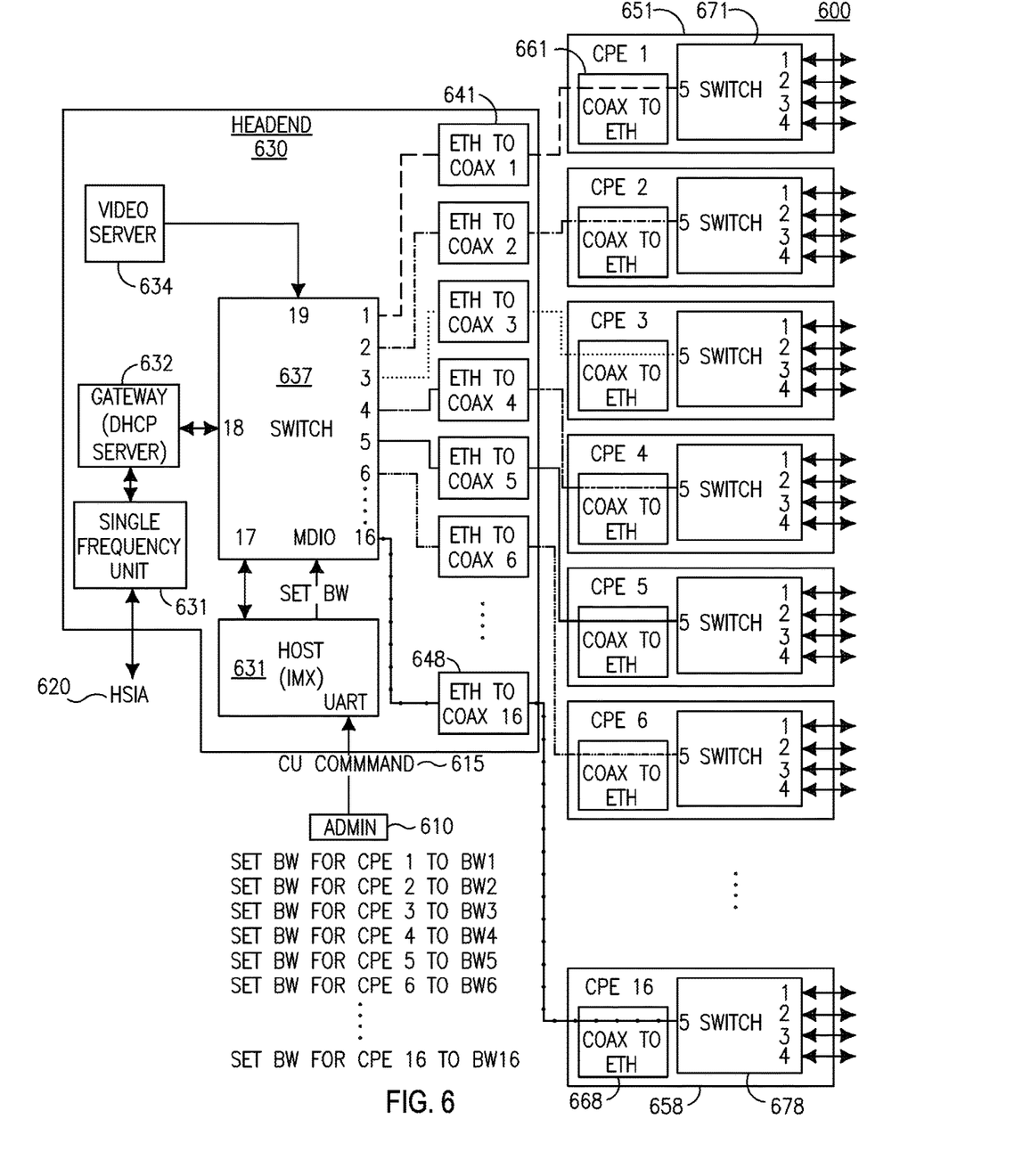
FIG. 6 is a system diagram of an example headend using a Gigabit Passive Operating Network (GPON) signal and 16 CPEs.

FIG. 6 is a system diagram of an example headend using a Gigabit Passive Operating Network (GPON) signal and 16 CPEs. In an example shown in system 600, as in system 300 in FIG. 3, the headend 630 may transmit to 16 CPEs, such as CPE 651 (CPE 1) through CPE 658 (CPE 16), and, accordingly, the headend 630 may transmit data signals on 16 channels and assign 16 BWs. The switch 637 may transmit a data signal on a different channel for each of the 16 CPEs. The headend 630 may transmit the video signal on a different frequency than the data signals.

Further, the switch 637 may send the signals to Ethernet to coaxial microchip processors, such as Ethernet to coaxial microchip 641 through Ethernet to coaxial microchip 648, for transmission to the 16 CPEs. Further, the headend 330 may receive a data signal from each CPE over the RF coaxial cable system and transmit the data signal to the Internet and/or other networks over the fiber optic port. In a further example, the headend 630 may operate as a headend server and include local processing capabilities.

In system 600, unlike in system 300 in FIG. 3, the headend 630 may receive an HSIA data signal 620 as a Gigabit Passive Operating Network (GPON) signal, through a single frequency unit 631. The GPON signal may be converted into an Ethernet signal by the single frequency unit 631 and then transmitted to a gateway 632, which may include a DHCP server. The gateway 631 may then send the data signal to the switch 637. The switch 637 may also receive video signals from a CATV provider or from a video server 634 or both. Further, an administrator 610 may send one or more commands 615 to a host 631 to remotely configure BW throughput assignment, provisioning and control.

Transmission from the headend 630 to CPE 651 (CPE 1) through CPE 658 (CPE 16) (CPE 7 through CPE 15 not shown) may operate in a manner similar to that in system 300, including the operation of coaxial to Ethernet microchip processors 661 through 668, Ethernet to coaxial microchip 641 to 648, switches 671 through 678. Also, transmission from CPE 651 (CPE 1) through CPE 658 (CPE 16) to headend 630 and then to gateway 632, may operate in a manner similar to the in system 300 in FIG. 3, except that gateway 632 may then transmit an Ethernet signal to single frequency unit 631, which may then convert the Ethernet signal to a GPON signal. The single frequency unit 631 may then transmit the GPON signal to the service or telecommunications provider.

In additional examples, not shown for conciseness, an example headend using GPON may transmit to 8, 24, 48 or 64 CPEs. One of ordinary skill in the art will understand that the headend using GPON and the 64 CPEs may operate in a manner similar to that in system 200 in FIG. 2, system 400 in FIG. 4 and system 500 in FIG. 5 but with added GPON operability. One of ordinary skill in the art will understand that various different combinations of data signal inputs to the headend and throughputs to the CPEs may be used in different examples.

Figure 7:
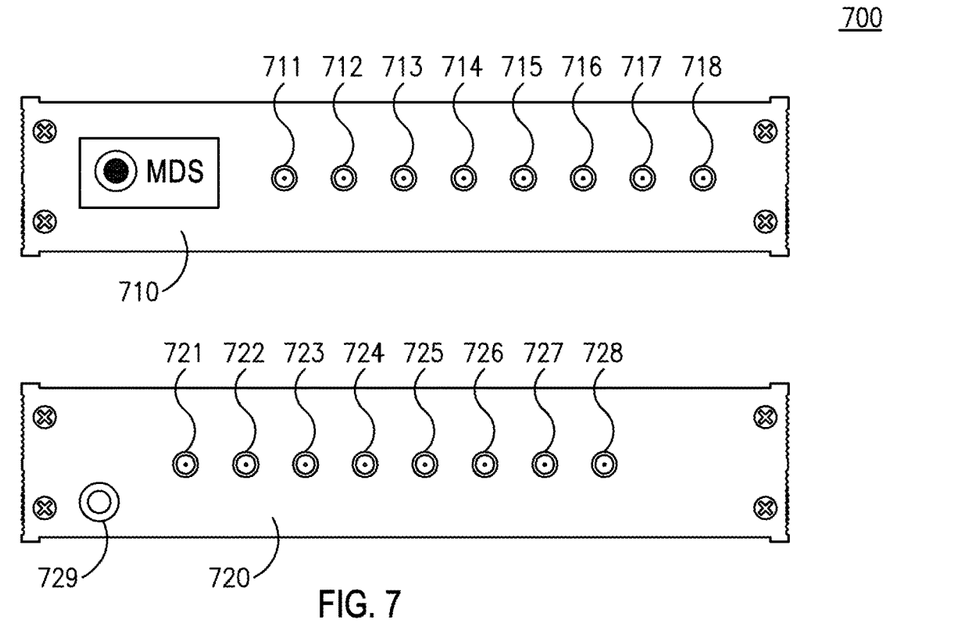
FIG. 7 is a diagram of an example headend housing.

FIG. 7 is a diagram of an example headend housing. As shown in housing 700, the headend may receive a 10 Gb/s data signal via a 10 Gb/s data port 729 and CATV video signals via multiple F connector ports. In an example, the CATV video signals may be received via 8 F connectors, 721, 722, 723, 724, 725, 726, 727, 728 at the back 720 of the headend. Further, the headend may transmit the data signals on 8 channels to 8 CPEs via 8 F connectors, 711, 712, 713, 714, 715, 716, 717, 718 at the front 710 of the headend. In an additional example, not shown, the 8 F connector used to transmit data signals may be on the same side of the housing as the 8 F connections which receive CATV video signals. The headend may transmit the video signal on a different frequency than the data signals via the same 8 F connectors, 711, 712, 713, 714, 715, 716, 717, 718. As an example, the headend may transmit an output data signal with a throughput of up to 1 Gb/s to each CPE. In an example, the headend may receive input data and video signals from a CATV service provider. Further, in an example, the headend may be housed in a 19-inch rack mountable chassis. In a further example, the headend may operate as a headend server and include local processing capabilities. In addition, the headend may receive a data signal from each CPE over the RF coaxial cable and transmit the data signal to the Internet and/or other networks over the fiber optic port.

In another example, the headend may transmit the data signals on 4 channels to 4 CPEs via 4 F connectors with a throughput of up to 1 Gb/s to each CPE. The headend may transmit the video signal on a different frequency than the data signals via the same 4 F connectors.

In a further example, the headend may transmit the data signals on 3 channels to 3 CPEs via 3 F connectors with a throughput of up to 2.6 Gb/s to each CPE. The headend may transmit the video signal on a different frequency than the data signals via the same 3 F connectors.

In a further example, the headend may receive a 20 Gb/s data signal via two 10 Gb/s data ports. The headend may transmit the data signals on 16 channels to 16 CPEs via 16 F connectors with a throughput of up to 1 Gb/s to each CPE. The headend may transmit the video signal on a different frequency than the data signals via the same 16 F connectors.

In yet a further example, the headend may transmit the data signals on 4 channels to 4 CPEs via 4 F connectors with a throughput of up to 2.6 Gb/s to each CPE. The headend may transmit the video signal on a different frequency than the data signals via the same 4 F connectors.

In yet another example, the headend may receive a 30 Gb/s data signal via three 10 Gb/s data ports. In a further example, the headend may receive a 40 Gb/s data signal via a 40 Gb/s data port. The headend may transmit the data signals on 24 channels to 24 CPEs via 24 F connectors with a throughput of up to 1 Gb/s to each CPE. The headend may transmit the video signal on a different frequency than the data signals via the same 24 F connectors.

In yet another example, the headend may transmit the data signals on 8 channels to 8 CPEs via 8 F connectors with a throughput of up to 2.6 Gb/s to each CPE. The headend may transmit the video signal on a different frequency than the data signals via the same 8 F connectors.

In yet a further example, the headend may receive a 50 Gb/s data signal via five 10 Gb/s data ports. In a further example, the headend may receive an 80 Gb/s data signal via two 40 Gb/s data port. The headend may transmit the data signals on 48 channels to 48 CPEs via 48 F connectors with a throughput of up to 1 Gb/s to each CPE. The headend may transmit the video signal on a different frequency than the data signals via the same 48 F connectors.

In yet another further example, the headend may transmit the data signals on 16 channels to 16 CPEs via 16 F connectors with a throughput of up to 2.6 Gb/s to each CPE. The headend may transmit the video signal on a different frequency than the data signals via the same 16 F connectors.

In still a further example, after receiving an 80 GB/s data signal, the headend may transmit the data signals on 24 channels to 24 CPEs via 24 F connectors with a throughput of up to 2.6 Gb/s to each CPE. The headend may transmit the video signal on a different frequency than the data signals via the same 24 F connectors.

In still another example, the headend may receive a 100 Gb/s data signal via a 100 Gb/s data port. The headend may transmit the data signals on 24 channels to 24 CPEs via 24 F connectors with a throughput of up to 2.6 Gb/s to each CPE. The headend may transmit the video signal on a different frequency than the data signals via the same 24 F connectors.

In yet a further example, the headend may receive a 200 Gb/s data signal via two 100 Gb/s data port, a 160 Gb/s via four 40 Gb/s data ports or a 200 Gb/S data signal via five 40 Gb/s data ports. The headend may transmit the data signals on 48 channels to 48 CPEs via 48 F connectors with a throughput of up to 2.6 Gb/s to each CPE. The headend may transmit the video signal on a different frequency than the data signals via the same 48 F connectors.

In an additional example, The headend may transmit the data signals on 64 channels to 64 CPEs via 64 F connectors with a throughput of up to 2.6 Gb/s to each CPE. The headend may transmit the video signal on a different frequency than the data signals via the same 64 F connectors.

Figure 8:
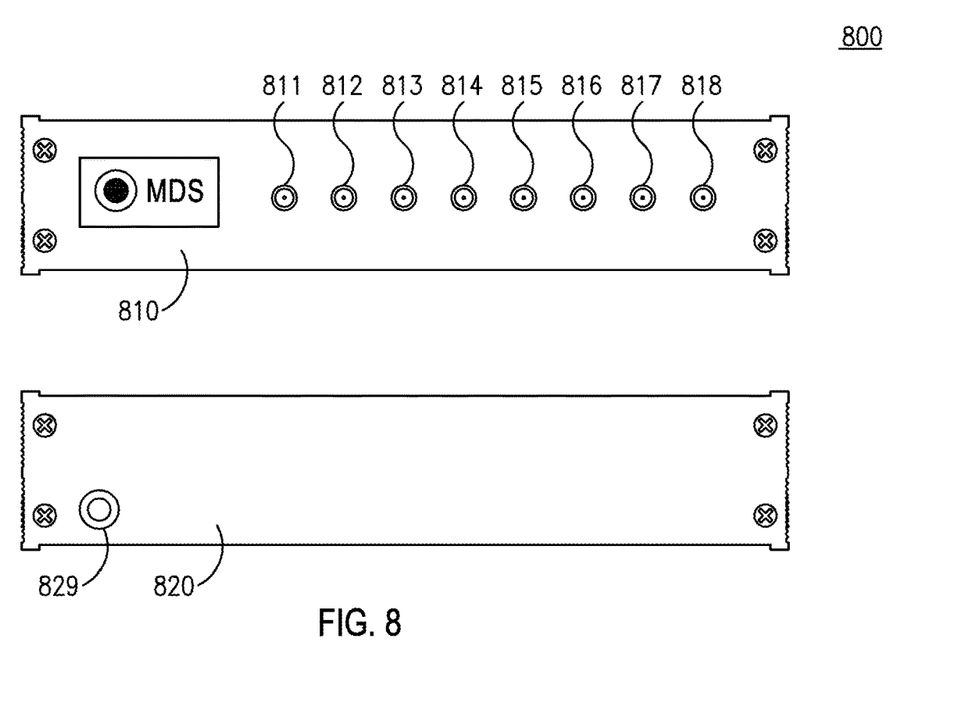
FIG. 8 is a diagram of another example headend housing.

In additional examples, a throughput of up to 3.4 Gb/s and up to 10 Gb/s may be transmitted from the headend to the CPEs. One of ordinary skill in the art will understand that various different combinations of data signal inputs to the headend and throughputs to the CPEs may be used in different examples, FIG. 8 is a diagram of another example headend housing. As shown in housing 800, the headend may receive a data signal via a 10 Gb/s data port 829 at the back 820 of the headend. Further, the headend may transmit 8 data signals on 8 channels to 8 CPEs via 8 F connectors, 811, 812, 813, 814, 815, 816, 817, 818 at the front 810 of the headend. In an additional example, not shown, the 8 F connector used to transmit data signals may be on the same side of the housing as the 10 Gb/S data port. The headend may transmit an output data signal of 1 Gb/s to each CPE. In an example, the headend may receive the input data signal from a telecommunications service provider. Further, in an example, the headend may be housed in a 19-inch rack mountable chassis. In a further example, the headend may operate as a headend server and include local processing capabilities. In addition, the headend may receive a data signal from each CPE over the RF coaxial cable and transmit the data signal to the Internet and/or other networks over the fiber optic port.

In an example, after receiving the input data signal from a telecommunications service provider, the headend may transmit the data signals on 4 channels to 4 CPEs via 4 F connectors with a throughput of up to 1 Gb/s to each CPE. In a further example, the headend may receive a 20 Gb/s data signal via two 10 Gb/s data ports. The headend may transmit the data signals on 16 channels to 16 CPEs via 16 F connectors with a throughput of up to 1 Gb/s to each CPE. In yet another example, the headend may receive a 30 Gb/s data signal via three 10 Gb/s data ports. The headend may transmit the data signals on 24 channels to 24 CPEs via 24

F connectors with a throughput of up to 1 Gb/s to each CPE. In yet a further example, the headend may receive a 50 Gb/s data signal via five 10 Gb/s data ports. The headend may transmit the data signals on 48 channels to 48 CPEs via 48 F connectors with a throughput of up to 1 Gb/s to each CPE.

As in housing 700 in FIG. 7, the housing 800 may include 3, 4, 8, 16, 24, 48 and 64 F connectors in additional examples. The headend may thereby transmit the data signals on 3 channels to 3 CPEs, on 4 channels to 4 CPEs, on 8 channels to 8 CPEs, on 16 channels to 16 CPEs, on 24 channels to 24 CPEs, on 48 channels to 48 CPEs and on 64 channels to 64 CPEs, One of ordinary skill in the art will understand that various different combinations of data signal inputs to the headend and throughputs to the CPEs may be used in different examples, as with housing 700 in FIG. 7.

In a further example, the headend may have a mean time before failure (MTBF) of fifteen years. The headend may include redundant power supplies, such as dual 1+1 alternating current (AC) power supplies. Further, the headend may include large heat-sinks on the heat producing components. In this way, the headend may be cooled effectively by convection cooling without the use of cooling fans. As a result, the headend may not be at risk of failure due to the failure of a cooling fan, and may have increased reliability and increased MTBF. In a further example, the headend may transmit and receive Institute of Electrical and Electronics Engineers (IEEE) 802.11 wireless transmissions to, for example, wirelessly offload transmissions.

In a further example, the headend may include global positioning system (GPS) capability. The headend may report GPS location and tracking data. Further, the headend may receive GPS data from the CPE and report this data over the Internet or other networks to a telecommunications provider or other recipients, such as server based applications in use by the consumer.

Further, the CPE may have GPS capability and may report its location using GPS data. In addition, the CPE may receive GPS data from other devices, such as wireless devices, and report this data to the headend. The headend may then further report this data, as described above.

In a further example, the CPE may include the capability to offload wireless communications from a wireless device of a consumer, including second generation (2G), third generation (3G), fourth generation (4G) and fifth generation (5G) communications. For example, a consumer may use a wireless device in a residence. In an example, the wireless telecommunications provider or the device may determine if an offload should occur. For example, the wireless telecommunications provider or the device may consider an offload to try to increase the efficiency of the wireless network, lower consumer costs or for other reasons. If a determination is made to offload the communications, the wireless telecommunications provider may direct the device, or the device may determine, to offload communications to the CPE. The CPE may transmit and receive offloaded voice and data transmissions to and from the wireless device. The CPE may in turn receive and transmit offloaded voice and data transmission from and to the headend.

In a further example, the headend may transmit and receive the offloaded voice and data transmissions. The headend may in turn receive and transmit the offloaded voice and data transmissions to the wireless telecommunications provider via the Internet or another network. Further, the headend may report details of such communications offloading to one or more of a CATV provider, a telecommunications provider, the wireless telecommunications provider, the consumer and others. This reporting may include the quantity of the communications offloaded, the date and time of the offload and which wireless telecommunications provider the offload was performed for. The reporting may be done through software, firmware or a combination.

Further, in an example, the CPE may include autosync and channel sensing capability. The CPE may automatically select and connect to an EoC or MoCA channel without operator intervention or configuration. The CPEs may include level 2 (L2) and/or level 3 (L3) capability. Also, the CPEs may include access points (APs). Further, the APs may transmit and receive IEEE 802.11 wireless transmissions. For example, the APs may transmit and receive IEEE 802.11a, 802.11b, 802.11g, 802.11n and/or 802.11ac wireless transmissions.

Further, in an example, provisioning and control, such as BW provisioning and control, may be remotely configurable. The headend or the CPE or both may be remotely monitored and manageable through a Telnet/Secure Shell (SSH) protocol and provide simple network management protocol (SNMP) traps in the event of any faults or alarms or both. As a further example, the headend or the CPE or both may use a monitoring channel that may be located in a separate virtual local area network (ULAN) and may connect to the service provider. Also, snooping capabilities may be provided, including, as an example, internet group management protocol (IGMP) snooping. The configuration, monitoring and management may be done through cloud based management software. The cloud based management software may provide full management of the system and any applicable applications that are installed. The management software may include a graphical user interface (GUI). Further, the configuration, monitoring and management may be done through firmware and hardware programming. The management software may be run on a LINUX operating system (OS).

In a further example, the headend or the CPE or both may include a built-in amplifier. The built-in amplifier may include an active 15 decibel (dB) amplifier. Further, the CPE may include the ability to transmit and receive Bluetooth transmissions.

In a further example, the headend may include VLANs, quality of service (QoS), data rate limiting and packet based priority and may route various types of data traffic according to the data traffic classification or priority or both. Further, in an example, the features and services of the headend or the CPE or both may be remotely configurable, and the features and services may be provisioned or turned on or off remotely.

Further, in an example, the headend may include encoder or decoder or both capability. Also, in an additional example, the headend may operate as a headend server and include local processing capabilities. The headend may include a microprocessor, such as an INTEL microprocessor. The may also include a disk drive for local streaming and processing capabilities. For example, the headend may download video content from sources including, but not limited to, NETFLIX, VUDU and HULU. The headend may include a video server. The headend may run various applications, including, but not limited to, ANDROID, IOS and MICROSOFT applications.

In an example, the headend may combine various features in a single device. For example, the headend may combine the features of converting Ethernet signals to coaxial cable signals and a VoD server. In another example, the headend may combine the features of converting Ethernet signals to coaxial cable signals, a VoD server, operating as a headend server and offloading transmissions from a wireless telecommunications provider. In a further example, the headend may combine the features of converting Ethernet signals to coaxial cable signals, a VoD server, operating as a headend server, offloading transmissions from a wireless telecommunications provider and cloud based management software.

In a yet further example, the headend may combine the features of receiving a GPON signal, converting the GPON signal to an Ethernet signal, operating as a headend server, then converting the Ethernet signal to a coaxial cable signal and transmitting the coaxial cable signal to a CPE. In an additional example, the headend may combine the features of receiving a GPON signal, converting the GPON signal to an Ethernet signal, operating as a headend server, then converting the Ethernet signal to a coaxial cable signal, transmitting the coaxial cable signal to a CPE and a VoD server. In yet another example, the headend may combine the features of receiving a GPON signal, converting the GPON signal to an Ethernet signal, operating as a headend server, then converting the Ethernet signal to a coaxial cable signal, transmitting the coaxial cable signal to a CPE, a VoD server and offloading transmissions from a wireless telecommunications provider. In still another example, the headend may combine the features of receiving a GPON signal, converting the GPON signal to an Ethernet signal, operating as a headend server, then converting the Ethernet signal to a coaxial cable signal, transmitting the coaxial cable signal to a CPE, a VoD server, offloading transmissions from a wireless telecommunications provider and cloud based management software.

One of ordinary skill in the art will appreciate that the headend may include additional combinations of the features described herein and operate in a manner similar to that described herein. Further, that the CPE may include additional combinations of the features described herein and operate in a manner similar to that described herein.

Although examples, features and elements are described above in particular combinations, one of ordinary skill in the art will appreciate that each example, feature or element can be used alone or in any combination with the other examples, features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media, such as non-transitory computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for use in a headend communications device, the method comprising:
   receiving an input data signal and video signals over one or more ports;
   switching the input data signal to a plurality of data signals;
   converting, using a small form factor pluggable device plugged into an external port of the headend communications device, the plurality of data signals to a plurality of output Multimedia over Coax Alliance (MoCA) compliant coaxial cable signals, wherein the small form factor pluggable device comprises a microchip configured to convert data signals into MoCA compliant coaxial cable signals, and wherein the microchip operates independently from the headend communications device to convert the data signals into the MoCA compliant coaxial cable signals; and
   transmitting the plurality of output MoCA compliant coaxial cable signals and the video signals via the small form factor pluggable device, wherein the video signals are unmodified by the small form factor pluggable device, wherein the video signals are not combined with the plurality of output MoCA compliant coaxial cable signals, and wherein the video signals are transmitted over a different frequency than the plurality of output MoCA compliant coaxial cable signals.

2. The method according to claim 1, wherein the output MoCA compliant coaxial cable signals are MoCA 1.1 compliant signals.

3. The method according to claim 1, wherein the output MoCA compliant coaxial cable signals are MoCA 2.0 compliant signals.

4. The method according to claim 1, wherein the output MoCA compliant coaxial cable signals are MoCA 3.0 compliant signals.

5. The method according to claim 1, wherein the input data signal is a 10 Gb/s data signal.

6. The method according to claim 1, wherein the plurality of output MoCA compliant coaxial cable signals are transmitted via coaxial cable to a plurality of pieces of consumer premises equipment (CPE).

7. The method according to claim 1, wherein each of the plurality of output MoCA compliant coaxial cable signals is a 1 Gb/s signal.

8. The method according to claim 1, wherein the input data signal is a 100 Gb/s data signal.

9. The method according to claim 1, wherein each of the plurality of output MoCA compliant coaxial cable signals is a 2.6 Gb/s signal.

10. The method according to claim 1, wherein at least one of the plurality of output MoCA compliant coaxial cable signals is a transmission offloaded from a wireless telecommunications provider.

11. A headend communications device, the headend communications device comprising:
    a transceiver operatively coupled to a switch, the transceiver and switch configured to receive an input data signal and video signals over one or more ports, the switch configured to convert the input data signal to a plurality of data signals;
    the switch operatively coupled, via an external port of the headend communications device, to at least one small form factor pluggable comprising a microchip configured to:
      convert the plurality of data signals into a plurality of output Multimedia over Coax Alliance (MoCA) compliant coaxial cable signals;
      operate independently from the headend communications device to convert the plurality of data signals into the plurality of MoCA compliant coaxial cable signals; and
      transmit the video signals and the plurality of output MoCA compliant coaxial cable signals, wherein the video signals are unmodified by the microchip, wherein the video signals are not combined with the plurality of output MoCA compliant coaxial cable signals, and wherein the video signals are transmitted over a different frequency than the plurality of output MoCA compliant coaxial cable signals; and the at least one small form factor pluggable operatively coupled to an F connector configured to the video signals and the plurality of output MoCA compliant coaxial cable signals, wherein the video signals are unmodified, wherein the video signals are not combined with the plurality of output MoCA compliant coaxial cable signals, and wherein the video signals and are transmitted over the different frequency than the plurality of output MoCA compliant coaxial data signals.

12. The device according to claim 11, wherein the plurality of output MoCA compliant coaxial cable signals are MoCA 1.1 compliant signals.

13. The device according to claim 11, wherein the wherein the plurality of output MoCA compliant coaxial cable signals are MoCA 2.0 compliant signals.

14. The device according to claim 11, wherein the wherein the plurality of output MoCA compliant coaxial cable signals are MoCA 3.0 compliant signals.

15. The device according to claim 11, wherein the input data signal is a 10 Gb/s data signal.

16. The device according to claim 11, wherein the plurality of output MoCA compliant coaxial cable signals are transmitted via coaxial cable to a plurality of pieces of consumer premises equipment (CPE).

17. The device according to claim 11, wherein each of the plurality of output MoCA compliant coaxial cable signals is a 1 Gb/s signal.

18. The device according to claim 11, wherein the input data signal is a 100 Gb/s data signal.

19. The device according to claim 11, wherein each of the plurality of output MoCA compliant coaxial cable signals is a 2.6 Gb/s signal.

20. The device according to claim 11, wherein at least one of the plurality of output MoCA compliant coaxial cable signals is a transmission offloaded from a wireless telecommunications provider.

21. The method according to claim 1, wherein the plurality of output MoCA compliant coaxial cable signals are transmitted to another small form factor pluggable device comprising another microchip configured to convert the plurality of output MoCA compliant coaxial cable signals into data signals.

22. The device according to claim 11, wherein the plurality of output MoCA compliant coaxial cable signals are transmitted by the microchip to another small form factor pluggable device comprising another microchip configured to convert the plurality of output MoCA compliant coaxial cable signals into data signals.

* * * * *